United States Patent [19]
Hedberg et al.

[11] Patent Number: 4,581,406
[45] Date of Patent: Apr. 8, 1986

[54] FLUOROELASTOMER CONTAINING POLYETHYLENE COMPOSITION AND PROCESS FOR EXTRUDING SAME

[75] Inventors: Johan G. Hedberg; Lawrence C. Muschiatti, both of Wilmington, Del.

[73] Assignee: E. I. Du Pont De Nemours and Company, Wilmington, Del.

[21] Appl. No.: 743,414

[22] Filed: Jun. 11, 1985

[51] Int. Cl.$^4$ .............................................. C08K 3/04
[52] U.S. Cl. ................................... 524/520; 524/495; 525/199
[58] Field of Search ................. 524/520; 525/199, 200

[56] References Cited

U.S. PATENT DOCUMENTS

| | | | |
|---|---|---|---|
| 3,125,547 | 3/1964 | Blatz | 260/45.5 |
| 3,851,018 | 11/1974 | Kelly | 524/544 |
| 3,898,361 | 8/1975 | Bjerk | 428/325 |
| 4,045,402 | 8/1977 | Bjerg | 428/325 |
| 4,252,858 | 2/1981 | Chao et al. | 525/199 |

FOREIGN PATENT DOCUMENTS 45-30574 10/1970 Japan .

OTHER PUBLICATIONS

Chem. Abs. 101–('84) 193414y, Stevens "Rubber World" 1984 190(6).
C. K. Shih, "Rheological Properties of Incompatible Blends of Two Elastomers", Nov. 1976.
R. C. Kanu and M. T. Shaw, "Rheology of Polymer Blends: Simultaneous Slippage and Entrance Pressure Loss in the Ethylene-Propylene-Diene (EPDM)/Viton System", Jun. 1982.

Primary Examiner—Herbert J. Lilling

[57] ABSTRACT

A composition comprising 2–3 wt. % carbon black, 25–1000 ppm and preferably 75–250 ppm of a fluoroelastomer and the remainder polyethylene is disclosed. The fluoroelastomer prevents die buildup during extrusion of the composition which is believed to be caused by moisture associated with the carbon black. Alternatively, the die may be conditioned by extruding polyethylene containing 0.5–5 wt. % of the fluoroelastomer and then carbon black containing polyethylene without the fluoroelastomer can be extruded for a substantial period before die buildup begins to occur.

2 Claims, No Drawings

FLUOROELASTOMER CONTAINING POLYETHYLENE COMPOSITION AND PROCESS FOR EXTRUDING SAME

BACKGROUND OF THE INVENTION

1. Field of the Invention

The present invention relates to a composition comprising polyethylene, 1–5% and preferably 2–3% carbon black and 50–1000 ppm of certain fluoroelastomers which is extrudable without buildup on the die lips which occurs when the fluoroelastomer is not present.

2. Prior Art

Blatz, U.S. Pat. No. 3,125,547 discloses adding fluorocarbon polymers to hydrocarbon polymers to avoid the "stick-slip" phenomenon which occurs at high extrusion rates.

DETAILED DESCRIPTION

The present invention overcomes the problem of die buildup (deposits which accumulate on the surface of a die) which occurs when polyethylene containing carbon black is extruded. The present invention eliminates the problem of die buildup by adding from 25 to 1000 ppm, with from 75 to 250 ppm being preferred, of a fluoroelastomer to the carbon black-containing polyethylene. The die buildup problem is aggravated by moisture associated with the carbon black pigment.

The polyethylenes useful in the present invention include conventional high pressure, low density polyethylenes, and linear low pressure low density, medium density, and high density polyethylene.

The fluoroelastomers useful in the present invention contain from 30 to 70 parts by weight repeating units derived from vinylidene fluoride, from 25 to 70 parts by weight repeating units derived from hexafluoropropylene and from 0 to 35 parts by weight repeating units derived from tetrafluoroethylene. Optionally, the fluoroelastomer may contain up to 5 weight percent of cure site monomers such as 4-bromo-3,3,4,4-tetrafluorobutene. The particle size of the fluoroelastomer is not particularly critical.

The die can be conditioned by extruding polyethylene containing relatively large amounts of the fluoroelastomer such as 1% for a few minutes and die buildup will not occur upon returning to extruding carbon black containing fluoroelastomer free polyethylene for an extended period of time, i.e., ½ hour or longer.

EXAMPLES

In the Examples to follow, laboratory extrusions were carried out using a 3½" (89 mm) diameter Davis Standard extruder having a barrel length to diameter ratio of 24 to 1. The extruder was fitted with a typical polyethylene screw having 5 turns transition, 14 turns metering (0.180", 4.57 mm deep) and mixing pins. The crosshead was a compensating flow type and a combination 20-40-60 mesh screen pack was used with a breaker plate. The extruder has 5 heating zones on the barrel with separate heaters on the crosshead and die.

EXAMPLE I

Black linear medium density polyethylene resins having a melt index of 0.85 dg/min., a density of 945 kg/m$^3$ and containing 2.5 wt. % carbon black were extruded into tubing at high speed to qualitatively evaluate the quantity of residue building up on the surface of the die. Table I describes the extrusion conditions. A magnifying glass was used to detect minor amounts of buildup.

When extruded without the fluoroelastomer, which throughout the Examples contained 60 wt. % vinylidene fluoride, 40 wt. % hexafluoropropylene and had a Mooney viscosity of 60, pigmented polyethylene produced die deposits immediately and the buildup was excessive in less than five minutes. This same resin pellet blended in a cement mixer with 0.5% of 1.4 dg/min. melt index, 920 kg/m$^3$ density linear polyethylene containing 1 wt. % of the fluoroelastomer described above and added directly to the hopper produced a small amount of buildup initially but ceased to form residue as the extrusion proceeded.

Die buildup was also eliminated by first conditioning the extruder and die with a small amount of the fluoroelastomer containing polyethylene described above. After conditioning, the pigmented resin was extruded 40 minutes without perceptible die buildup.

Cleaning the die with glass beads to eliminate the effect of conditioning, followed by the extrusion of the pigmented resin, produced immediate buildup.

These extrusions were carried out at an apparent shear rate of $1.1 \times 10^3 s^{-1}$. At this shear rate the addition of the fluoroelastomers to the system did not affect the temperature of the polyethylene melt, the barrel pressure or the extruder power requirements.

TABLE I

| EXTRUDER TEMPERATURE PROFILE (°C.) |
| --- |
| Barrel: 190° (Feed) - 204°-204°-204°-204° (Front) |
| Crosshead: 204° |
| Die: 232° |
| Stock: 236° |
| I.D. Die 0.600" (15.2 mm) |
| O.D. Mandrel 0.450" (11.4 mm) |
| Sizing Die Diameter 0.433" (11.0 mm) |
| Extrusion Rate 182 fpm (0.92 m/s) |
| Apparent Shear Rate $1.1 \times 10^3$ sec.$^{-1}$ |

EXAMPLE II

This Example demonstrates the effect of the fluoroelastomer used in Example I, die temperature and die land length on the elimination of die buildup while extruding simulated cable.

Polyethylene resins with and without the fluoroelastomer used in Example I were extruded as cable jackets over folded aluminum sheet at 100 fpm (0.51 m/s). The fluoroelastomer of Example I was added as a pellet blend in linear low density polyethylene as in Example I to the linear medium density polyethylene of Example I to give a total concentration of 100 ppm in the final blend.

Extruding the unmodified jacketing resin of Example I at 100 fpm produced an immediate buildup of residue on the surface of the die. The amount of residue became excessive in a very short period of time. Converting to the blend containing the fluoroelastomer stopped the deposits from forming. At the 100 ppm fluoroelastomer level very little extrusion time was required to condition the die and eliminate die buildup. Increasing the land length of the die or increasing the die temperature did not reduce the effectiveness of the fluoroelastomer in eliminating die buildup. The melt temperature of the extruded resin did not change when the fluoroelastomer was added. The extrusion conditions used are reported in Table II.

TABLE II

EXTRUSION CONDITIONS - EXAMPLE II JACKETING A MODIFIED COMMUNICATIONS CABLE CONSTRUCTION

Construction: 0.060" (1.5 mm) of polyethylene over 0.75" (19 mm) diameter folded aluminum sheet Guide Tips and Dies
| | |
|---|---|
| I.D. Die (#1 and #4) | 1.040" (26.42 mm) |
| O.D. Guide Tip (#1 and #4) | 0.805" (21.6 mm) |

Land Length
| | |
|---|---|
| Die #1 | 0.250" (6.35 mm) |
| Die #4 | 1.40" (35.6 mm) |

Extruder Temperature Profile, °C.

Barrel: 190° (Feed) - 204°-204°-204°-204° (Front)
Crosshead: 204°
Die: 218°
Extrusion Rate (Cable Speed) 100 fpm (0.51 m/s)
Apparent Shear Rate (Die) $7.5 \times 10^1$ sec.$^{-1}$

EXAMPLE III

This Example demonstrates the effectiveness of the fluoroelastomer when it is intimately mixed with the polyethylene prior to extrusion.

Concentrates of the fluoroelastomer, polyethylene and carbon black were prepared in the proportions reported in Table III in an "OOC" Banbury mixer using accepted mixing procedures.

TABLE III

| | Concentrate Composition, Wt. % | | |
|---|---|---|---|
| Ingredient | A | B | C |
| LMDPE | 30.8 | 66.57 | 66.43 |
| LLDPE | 30.8 | — | — |
| Fluoroelastomer | — | 0.13 | 0.27 |
| N110 Carbon Black | 38.4 | 33.3 | 33.3 |

In Table III LMDPE is linear medium density polyethylene having a density of 935 kg/m$^3$ and a melt index of 1.0 dg/min., LLDPE stands for the linear low density polyethylene containing 1 wt. % of the fluoroelastomer used in Example I and the independently added fluoroelastomer is a 60/40 copolymer of vinylidene fluoride and hexafluoropropylene having Mooney viscosity of 60. These concentrates were granulated and tumble blended with LMDPE (linear medium density polyethylene base resin having a melt index of 1.0 dg/min., and a density of 936 kg/m$^3$) in the percentages reported in Table IV. The base resin did not contain carbon black. The blends were extruded in a Waldron-Hartig extruder using a mixing screw, 40-60-80-100 mesh screen pack 3-hole pelletizing die and a temperature profile (°C.) 232° (feed)-238°-240°-246°(front). The pelletized resins were dried overnight at 71° C. prior to cable extrusion.

TABLE IV

RESINS FOR CABLE EXTRUSION

| | Resin Composition, Wt. % | | |
|---|---|---|---|
| Ingredients | D | E | F |
| LMDPE | 92.5 | 92.5 | 92.5 |
| Concentrate A | 7.5 | — | — |
| Concentrate B | — | 7.5 | — |
| Concentrate C | — | — | 7.5 |
| ppm Fluoroelastomer | 23 | 100 | 200 |
| Wt. % Carbon Black | 2.9 | 2.5 | 2.5 |

Extrusion Results—A control LMDPE black jacketing resin containing 2.5 wt % carbon black without the fluoroelastomer produced excessive die buildup immediately. The buildup increased significantly in amount with time. Resin E prepared at 100 ppm fluoroelastomer and resin D containing 23 ppm fluoroelastomer required a brief extruder conditioning period prior to the essentially complete elimination of buildup. Resin F containing 200 ppm fluoroelastomer did not require a detectable conditioning period. The incorporation of the fluoroelastomer into the black jacketing resins prior to extrusion either eliminated or reduced the occurrence of buildup to the level where it was barely perceptible.

The incorporation of the fluoroelastomer did not affect the melt temperature of the resin, the barrel pressure or power requirements of the extruder.

TABLE V

EXTRUSION CONDITIONS - EXAMPLE III

Extruder Temperature Profile, °C.

Barrel: 190° (Feed) - 204°-204°-204°-204° (Front)
Crosshead: 204°
Die: 218°
I.D. Die: 1.040" (26.42 mm)
O.D. Guide Tip: 0.850" (21.6 mm)
Die Land Length: 0.250" (6.35 mm)
Construction: 0.060" (1.5 mm) of black polyethylene jacketing resin over 0.75" (19.0 mm) diameter folded aluminum sheet.
Extrusion Rate: 100 fpm (0.51 m/s)
Apparent Shear Rate (Die) $7.5 \times 10^1$ sec.$^{-1}$

EXAMPLE IV

This Example demonstrates the ability of plant produced resins to eliminate die buildup. The fluoroelastomer was intimately mixed with linear medium density polyethylene base resin containing carbon black using both polyethylene concentrate and pure fluoroelastomer pellets.

Two linear medium density polyethylene black jacketing resins were manufactured in production equipment. Resin G was produced in production equipment from linear medium density polyethylene having a density of 947 kg/m$^3$ and a melt index of 0.87 dg/min., 2.5 wt. % of N110 carbon black, and sufficient low density linear polyethylene having a density of 947 kg/m$^3$ and a melt index of 1.4 dg/min., 1 wt. % of the fluoroelastomer described above to provide 25 ppm of the fluoroelastomer in the overall composition. Resin H was produced in production from linear medium density polyethylene having a density of 948 kg/min., a melt index of 0.82 dg/min., 2.5 wt. % of N110 carbon black, and 75 ppm of the fluoroelastomer supplied as pellets.

TABLE VI

EXTRUSION CONDITIONS - EXAMPLE IV

Extruder Temperature Profile, °C.

Barrel: 190° (Feed) - 204°-204°-204°-204° (Front)
Crosshead: 204°
Die: 218°
I.D. Die: 1.040" (26.42 mm)
O.D. Guide Tip: 0.850" (21.6 mm)
Die Land Length: 0.250" (6.35 mm)
Construction: 0.060" (1.5 mm) of black jacketing resin over 0.75 " (19.0 mm) diameter folded aluminum sheet
Extrusion Rates: 100 fpm (0.51 m/s) and 150 fpm (0.76 m/s)
Apparent Shear Rates: 100 fpm $7.5 \times 10^2 s^{-1}$
150 fpm $1.1 \times 10^3 s^{-1}$ The extrusion conditions and performance of the resins is reported in Table VII.

TABLE VII

| Resin | Extrusion Rate fpm (m/s) | Stock Temp. °C. | Barrel Pressure MPa (psi) | Horsepower |
| --- | --- | --- | --- | --- |
| G | 100 (0.52) | 244 | 3.96 (575) | 62.0 |
| H | 100 (0.52) | 242 | 3.65 (530) | 59.5 |
| H | 150 (0.76) | — | 3.96 (575) | 60.3 |

No die build up was observed extruding the resins under the conditions reported above.

We claim:

1. A melt extrudable composition consisting essentially of a polyethylene resin containing from 1 to 5 weight percent carbon black and from 235 to 1000 parts per million, based on the total composition, of a fluoroelastomer containing from 30 to 70 parts by weight repeating units derived from vinylidene fluoride, from 25 to 70 parts by weight repeating units derived from hexafluoropropylene and from 0 to 35 parts by weight repeating units derived from tetrafluoroethylene.

2. The melt extrudable composition of claim 1 wherein from 75 to 250 parts per million of the fluoroelastomer is present.

* * * * *